United States Patent
Garera et al.

(10) Patent No.: US 9,390,378 B2
(45) Date of Patent: Jul. 12, 2016

(54) SYSTEM AND METHOD FOR HIGH ACCURACY PRODUCT CLASSIFICATION WITH LIMITED SUPERVISION

(71) Applicant: Wal-Mart Stores, Inc., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 345 days.

(21) Appl. No.: 13/852,884

(22) Filed: Mar. 28, 2013

(65) Prior Publication Data
US 2014/0297570 A1    Oct. 2, 2014

(51) Int. Cl.
| G06N 99/00 | (2010.01) |
| G06Q 10/10 | (2012.01) |
| G06Q 50/00 | (2012.01) |
| G06F 17/30 | (2006.01) |

(52) U.S. Cl.
CPC ........ *G06N 99/005* (2013.01); *G06F 17/30707* (2013.01); *G06Q 10/101* (2013.01); *G06Q 50/01* (2013.01)

(58) Field of Classification Search
CPC .................................................. G06N 99/005
See application file for complete search history.

(56) References Cited

U.S. PATENT DOCUMENTS

| 5,950,173 A | 9/1999 | Perkowski |
| 6,751,600 B1 | 6/2004 | Wolin |
| 7,672,877 B1 | 3/2010 | Acton |

(Continued)

FOREIGN PATENT DOCUMENTS

| WO | WO2013184383 A2 | 12/2013 |
| WO | WO2014063157 A2 | 4/2014 |

OTHER PUBLICATIONS

J. Costa et al., "On Using Crowdsourcing and Active Learning to Improve Classification Performance", Intelligent Systems Design and Applications (ISDA), 2011 11th International Conference on. IEEE, pp. 469-475.*

(Continued)

*Primary Examiner* — Kakali Chaki
*Assistant Examiner* — Vincent Gonzales
(74) *Attorney, Agent, or Firm* — Bryan Cave LLP

(57) ABSTRACT

Systems and methods are disclosed herein for classifying records, such as product records, using a machine learning algorithm. After training a classification model according to a machine learning algorithm using an initial training set, records are classified and high confidence classifications identified. Remaining classifications are submitted to a crowdsourcing forum that validates or invalidates the classifications or marks them as to unclear to evaluate. Invalidated classifications are automatically analyzed to identify one or both of classification values and categories having a high proportion of invalidated classifications. Requests are transmitted to analysts to generate training data that is added to the training set. The process of classifying records and obtaining crowdsourced validation thereof may then repeat.

19 Claims, 5 Drawing Sheets

(56) References Cited

U.S. PATENT DOCUMENTS

| | | |
|---|---|---|
| 7,739,203 B2 | 6/2010 | Kettner |
| 7,870,039 B1 | 1/2011 | Dom |
| 8,036,945 B2 | 10/2011 | Speers |
| 8,271,495 B1 | 9/2012 | Skrenta |
| 8,275,765 B2 | 9/2012 | Li |
| 8,392,281 B1 | 3/2013 | Bashir |
| 8,510,307 B1 | 8/2013 | Touloumtzis |
| 8,572,013 B1 | 10/2013 | Nash |
| 8,583,645 B2 | 11/2013 | Treece |
| 2005/0028109 A1 | 2/2005 | Richards |
| 2008/0070223 A1 | 3/2008 | Lofkrantz |
| 2008/0082519 A1 | 4/2008 | Zentner |
| 2008/0097843 A1 | 4/2008 | Menon |
| 2009/0210325 A1 | 8/2009 | Borom |
| 2010/0070345 A1 | 3/2010 | Abelow |
| 2011/0224161 A1 | 9/2011 | Zhong |
| 2012/0005222 A1 | 1/2012 | Bhagwan |
| 2012/0088220 A1 | 4/2012 | Feng |
| 2012/0095828 A1 | 4/2012 | Evankovich |
| 2012/0166441 A1 | 6/2012 | Karidi |
| 2012/0278825 A1 | 11/2012 | Tran |
| 2012/0316889 A1 | 12/2012 | Carmel |
| 2013/0066961 A1 | 3/2013 | Naik |
| 2013/0144813 A1 | 6/2013 | Sengupta |
| 2013/0144949 A1 | 6/2013 | Mitchell, Jr. |
| 2013/0204652 A1 | 8/2013 | Marins |
| 2013/0204754 A1 | 8/2013 | Brelig |
| 2013/0290172 A1 | 10/2013 | Mashinsky |
| 2014/0058804 A1 | 2/2014 | Zhou |
| 2014/0129378 A1 | 5/2014 | Richardson |
| 2014/0214632 A1 | 7/2014 | Garera |

OTHER PUBLICATIONS

A. Gupta et al. "mCleark: Enabling Mobile Crowdsourcing in Developing Regions", CHI 2012, May 5-10, 2012, pp. 1843-1852.*

D. Karampinas and P. Triantafillou, "Crowdsourcing Taxonomies", ACM Extended Semantic Web Conference 2012, pp. 545-559.*

* cited by examiner

SYSTEM AND METHOD FOR HIGH ACCURACY PRODUCT CLASSIFICATION WITH LIMITED SUPERVISION

BACKGROUND

1. Field of the Invention

This invention relates to systems and methods for classification of large amounts of documents and other data.

2. Background of the Invention

Many attempts have been made to automatically classify documents or otherwise identify the subject matter of a document. In particular, search engines seek to identify documents that are relevant to the terms of a search query based on determinations of the subject matter of the identified documents. Another area in which classification of documents is important is in the area of product-related documents such as product descriptions, product reviews, or other product-related content. The number of products available for sale constantly increases and the number of documents relating to a particular product is further augmented by social media posts relating to products and other content.

Although some automatic classification methods are quite accurate, they are not a substitute for human judgment. Often documents identified or classified using automated methods are completely irrelevant. In addition, these methods are subject to manipulation by "spammers" who manipulate the word usage of content to obtain a desired classification but provide no useful content.

Of course, for a large volume of content, human classification of documents is not practical. The systems and methods described herein provide improved methods for incorporating both automated classification and human judgment in a highly effective manner.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
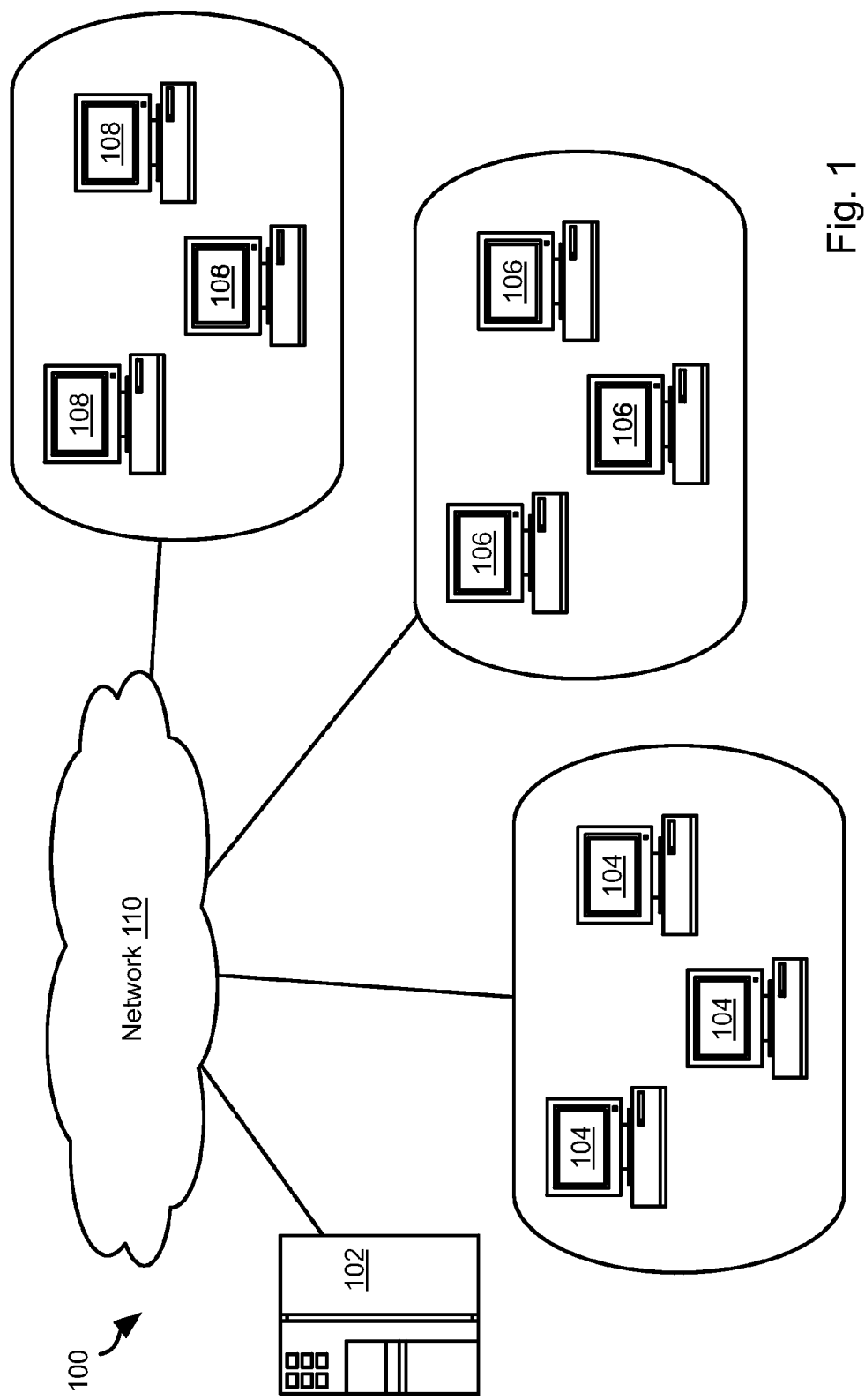
FIG. 1 is a schematic block diagram of a system for performing methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more analyst workstations 104 and one or more crowdsourcing workstations 106. In the methods disclosed herein, the analyst workstations 104 and crowdsourcing workstations 106 may be embodied as mobile devices such as desktop computers or other computing device such as a mobile phone or tablet computer. The methods disclosed herein may also be implemented with another population of users and corresponding merchant workstations 108 for making modifications to product records as prompted according to methods disclosed herein.

In some embodiments, some or all of the methods disclosed herein may be performed using a desktop computer or any other computing device as the analyst workstations 104, crowdsourcing workstations 106, and merchant workstations 108. For purposes of this disclosure, discussion of communication with a user or entity or activity performed by the user or entity (e.g. analyst, crowdsourcing community, merchant) may be interpreted as communication with a computer 104, 106, 108 associated with the user or entity or activity taking place on a computer associated with the user or entity. The analyst workstations 104, crowdsourcing workstations 106, and merchant workstations 108, may be viewed as an analyst computer network 104, crowdsourcing computer network 106, and merchant computer network 108 whereby tasks to be performed by one of these populations may be assigned to any member of the population by means of logic implemented by any of these computer networks, the server system 102, or some other entity.

Some or all of the server 102, analyst computers 104, crowdsourcing workstations 106, and merchant workstations 108 may communicate with one another by means of a network 110. The network 110 may be embodied as a peer-to-peer connection between devices, a connection through a local area network (LAN), WiFi network, the Internet, or any other communication medium or system. Each of the populations 104, 106, 108 of workstations may be coupled to one another by separate networks some or all of the three populations 104, 106, 108 of workstations may share a common network.

The server system 102 may be associated with a merchant, or other entity, providing classification services of documents. For example, the server system 102 may host a search engine or a site hosted by a merchant to provide access to information about products and user opinions about products. The server system 102 may additionally or alternatively implement a social networking site that enables the generation of content by a user. For example, the server system 102 may store, provide access to, or enable generation of, social media content for a site such as Facebook™, Twitter™, Four-Square™, LinkedIn™, or other social networking or blogging site that enables the posting of content by users.

Figure 2:
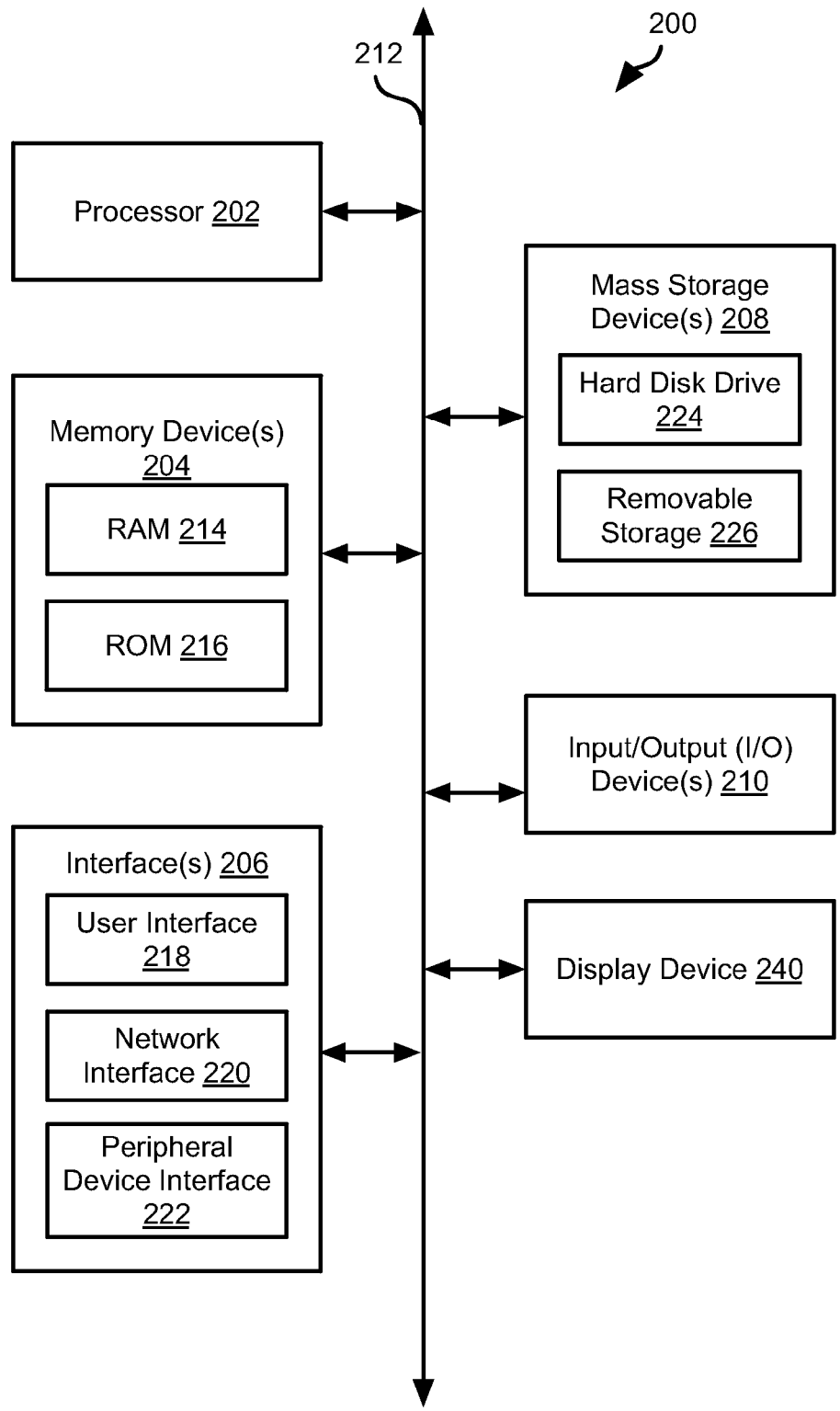
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, analyst workstation 104, crowdsourcing workstation 106, and merchant workstations 108, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
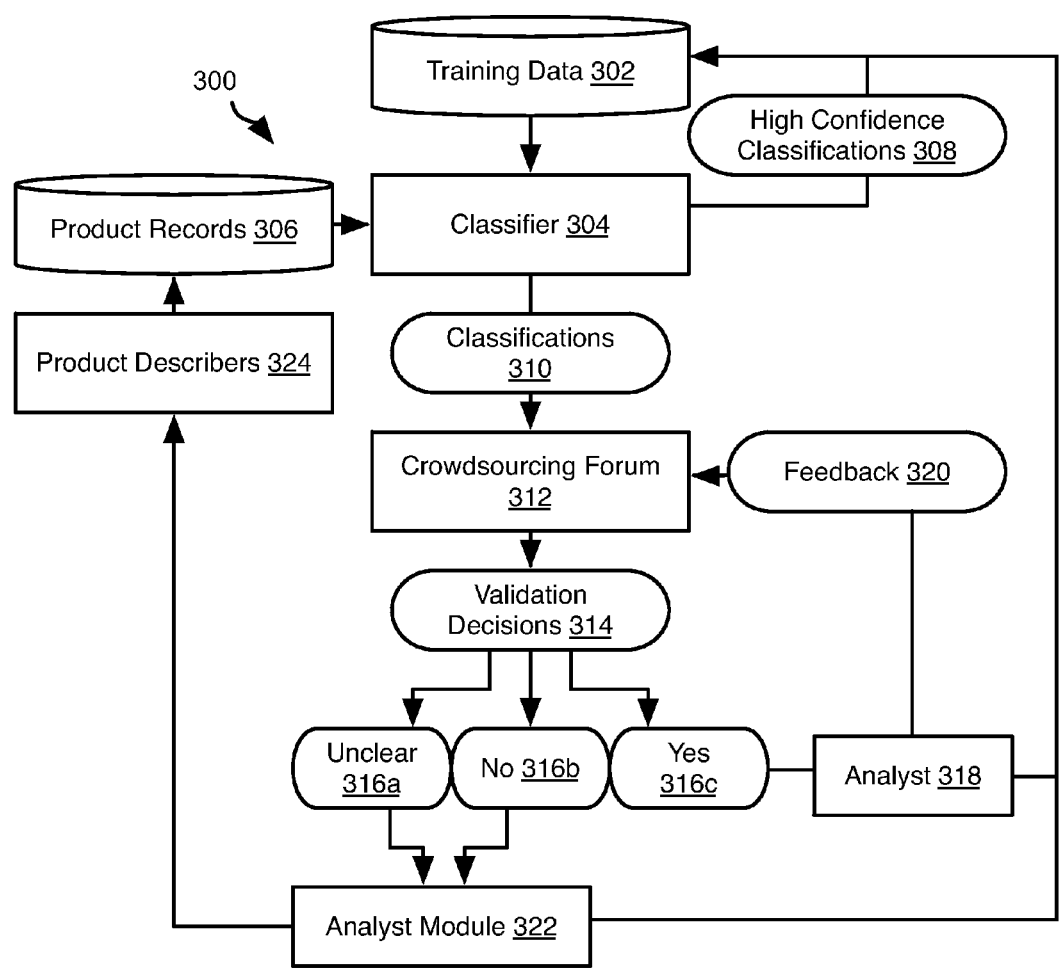
FIG. 3 is a schematic block diagram of modules implementing methods in accordance with embodiments of the present invention.

FIG. 3 illustrates a system 300 of software and/or hardware modules implementing classification methods disclosed herein. In some embodiments, the modules and data of the system 300 are implemented or accessed by the server system 102 or some other entity that provides an interface to the server system 102. The system 300 includes training data 302, such as stored in a database. The training data 302 may include various data values used to train a classification model. For example, the training data 302 may include entries of the form [text]->[classification value], where text is text that might form all or part of a record analyzed or a field of a record analyzed. The methods disclosed herein may advantageously be used when classifying products according to a product name or product record. Accordingly, text may include a product name or some or all of a product record for a product that has been classified either according to human judgment or according to an automated method that indicates with high confidence that [text] corresponds unambiguously to [classification value]. As will be described in greater detail below, entries may be added to the training data 302 over time.

The training data is input to a classifier 304. The classifier 304 may include executable and operational functions and data structures defining a machine learning algorithm and the state of a machine learning model. The particular machine learning algorithm used to implement the classifier 304 may include any machine learning algorithm known in the art, including, for example, a supervised or unsupervised learning algorithm, active learning algorithm, or the like. The classifier 304 creates or updates its state in response to the training data 302. The classifier 304 may then classify one or more records according to its state, such as product records 306 or some other records. The output of the classifier 304 may be entries similar to the training data, e.g. [text]->[classification value] pairings, where text is some or all of the text of a product record 306 and classification is a classification assigned by the classifier 304 according to the state of the classifier 304 as trained according to training data 302.

As known in the art of machine learning, decisions made by the algorithm, e.g. a classification of text, may be assigned a confidence score indicating how much support exists for the decision. Using this confidence score, classifications output by the classifier may be divided into high confidence classifications 308 and other classifications 310. For example, where resources for implementing the methods disclosed herein are limited, the number of classifications 310 selected for processing may be chosen in accordance with this capacity. For example, the M classifications with the lowest score may be processed as classifications 310 with the remainder treated as high confidence classifications 308. In other embodiments, a threshold for the confidence score may be chosen such that X percent of the classifications have a score below the threshold and are used as classifications 310.

In some embodiments, the classifications 310 and classifications 308 may include less than all classifications in a given iteration of the methods disclosed herein, such that only data with a confidence score above a first threshold are deemed high confidence classifications 308 and only classifications with a confidence below a second threshold are deemed classifications 310, where the second threshold is below the first threshold and a nonzero quantity of classifications have confidence scores between the first and second thresholds.

In some embodiments, the high confidence classifications 308 are added to the training data 302. In other embodiments the high confidence classifications 308 may be ignored for purposes of the methods disclosed herein. The high confidence data 308 may be used for other purposes, such as for responding to search queries or any other application in which an accurate classification of a record is of interest.

The classifications 310 may then be submitting to a crowdsourcing forum 312, such as to crowdsourcing workstations 306. The crowdsourcing forum 312 may implement logic for distributing tasks to individuals associated with the forum, receiving responses, and returning responses to a requesting entity. The crowdsourcing forum 312 may be implemented or hosted by a server system 102 or a server system owned or controlled by a different entity providing crowdsourcing services.

The crowdsourcing forum 312 may return, for some or all of the classifications 310, a validation decision 314. In some embodiments, for some or all of the classifications 310, the crowdsourcing forum 312 may return a yes or no response indicating that the classifications was or was not correct. In some embodiments, the crowdsourcing forum may also include a substitute classification for some or all of the classifications indicated as incorrect. In some embodiments, the crowdsourcing forum 312 may return an "unclear" response indicating that the [text] in a [text]-[classification value] output of the classifier is insufficient to accurately judge whether the classification is correct and/or what an accurate classification should be.

The unclear classifications 316a, invalid classifications 316b, and valid classifications 316c may be further processed. For example, the classifications 316c designated as valid by the crowdsourcing forum 312 may be added to the training data 302. Where a substitute classification has been supplied for an invalid 316b classification, the record and the substitute classification may also be added to the training data 302.

The valid classifications 316c, and possibly one or both of the unclear classifications 316a and invalid classifications 316b, may be submitted to analysts 318. The analysts 318 may then provide feedback 320 to the crowdsourcing forum. Submitting the some or all of the validation decisions 314 to the analysts 318 may include transmitting the validation decision to an analyst workstation 104 and displaying a prompt or interface on the analyst workstation to receive an evaluation of the correctness of the validation decision. The validation decisions may also be retrieved by one or more analyst workstations 104 either automatically or upon receiving an instruction by the analyst workstation 104 to retrieve a portion of the validation decisions 314 for review. For example, a random sampling of the validations decisions 314 may be selected for review. In some embodiments, samples of validation decisions 314 selected for review by the analyst 318 may be selected by category. For example, validation decisions 314 with respect to classifications including a particular classifier in the [classification value] field or a [classification value] belonging to a particular category may all be selected for review or sampled for review.

Feedback received from an analyst, such as input to an interface on an analyst computer 104, may include an indicator of whether a particular validation decision 314 was incorrect. Those validation decisions 314 found to be incorrect by the analyst 318 may be transmitted to the crowdsourcing forum 312. The feedback 320 may include some or all of an indication that a decision 314 was incorrect, a substitute classification from the analyst 318, the validation decision 314 (valid, invalid, unclear), a substitute classification of the validation decision 314 provided by the crowd sourcing forum 312, and the original classification 310 corresponding to the validation decision 314. A validation decision 314 may have an identifier associated therewith that identifies the individual participant in the crowdsourcing forum 312 that generated the decision 314. Accordingly, the feedback 320 for a validation decision 314 may include this identifier. The crowdsourcing forum 312 may then use this information to route the feedback 320 to the appropriate participant, e.g. a crowdsourcing workstation 106 operated by the participant. In other embodiments, each validation decision 314 may have a unique identifier that is used by the crowdsourcing forum 312 to route the feedback to the appropriate participant according to a record of past assignments of tasks.

Validation decisions 316c that have been received from the crowdsourcing forum 312, including those corrected or validated by analysts 318, may also be used as high-accuracy data for other purposes, such as responding to queries by users or any other method that can advantageously use accurately classified data. Accordingly, high confidence classifications 308 and the classifications corresponding to positive validation decisions 316c may be added to a production data set that is used for responding to queries or other requests for a classification associated with a product record.

In some embodiments, one or both of the unclear validation decisions 316a and invalid 316b validation decisions may be transmitted to an analyst module 322, that may interface with the same or different individuals or computing devices as the analysts 318. The analyst module 322 may be programmed to select classification values, i.e. values for the [classification value] fields of the classifications 310 for which additional training data is needed. The classification values may be selected individually or as a group. For example, a category of a taxonomy having one or more classification values as descendants thereof may be selected by the analyst module 322 for the generation of training data. A category of a taxonomy selected by the analyst module 322 may also have descendent sub-categories as well as individual classification values as descendants in the taxonomy.

An analyst module 322 may select classification values or categories of classification values on the basis on a percentage of classifications 310 referencing that classification value or category of classification values that were marked as invalid, or either invalid or unclear, by the crowdsourcing forum 312. The analyst module 322 then generates prompts that may be transmitted and/or displayed to analysts, e.g. analyst workstations 104, to generate additional training data when appropriate.

In some embodiments, classification values or categories of classification values may be selected based on a percentage of classifications 310 referencing that classification value or category of classifications that were marked as either invalid or unclear. For an individual classification value, a simple percentage threshold may be used: where X percent or more of the classifications 310 including that classification value were found to be invalid (or either invalid or unclear), then a prompt will be issued to generate training data relating to that classification value.

For a category of classification values, a raw percentage of classifications 310 including a classification value belonging to that category may be compared to a threshold and, if this percentage is above the threshold, a prompt may be issued to generated training data relating to that category. In other embodiments, the percentage of classification values belonging to the category that individually have a percentage of invalid classifications above a first threshold may be identified. The percentage of classification values belonging to the category that exceed the first threshold may be compared to a second threshold. Where the number of classification values exceeding the first threshold exceeds this second threshold, a prompt may be generated that instructs one or more analysts to generate training data relating to that category.

A prompt to generate training data may include the classification value or category for which training data is needed, some or all of the classifications 310 relating to the classification value or category included in the prompt, records that were improperly associated with the classification value or category by the classifier 304, records that were correctly associated with the classification value or category (e.g. as validated by the crowdsourcing forum 312), and other information.

Actual records used to generate training data ([text]-> [classification value] entries) may be selected by analysts from a static pool of records, such as the product records 306 of a product catalog or may be retrieved from another source or generated by the analyst. The selection and location of records may be a manual process of research and analysis according to human judgment. In some embodiments, to facilitate this process, records may be suggested by the analyst module 322. For example, where a first classification value is identified as in need of training data as described above, records incorrectly classified with other classification values belonging to the same category or subcategory as the first classification value in a taxonomy may be identified and transmitted for display on an analyst workstation 104 inasmuch as it is possible that the first classification value would be appropriate for some of these records.

In some embodiments, one or more records may be transmitted by the analyst module 322 to one or more product describers 324 (e.g. a merchant computer 108) with a request to add more descriptive data to the one or more records. In some embodiments, all records for unclear 316a validation decisions may be automatically transmitted to the product describers 324. In some embodiments, other records corresponding to the invalid decisions 316b may be transmitted to the product describers 324 in response to an instruction received from an analyst, such as from an analyst workstation 104. The decision to transmit the instruction may be according to human judgment. In some embodiments, an analyst may issue an instruction to the product describers 324 to reduce the amount of information in a record, for example by inputting an instruction to an analyst workstation 104 that then transmits the instruction to a merchant workstation 108. The instruction may include a record, identifier of a record, or an identifier for a category of records, and one or more words or classes of words that should be omitted from the identified record or records. Upon receiving such an instruction, a product describe 324 may input modifications to one or more product records using a merchant workstation 108, which then invokes addition of the modified records to the product record database 306.

Figure 4:
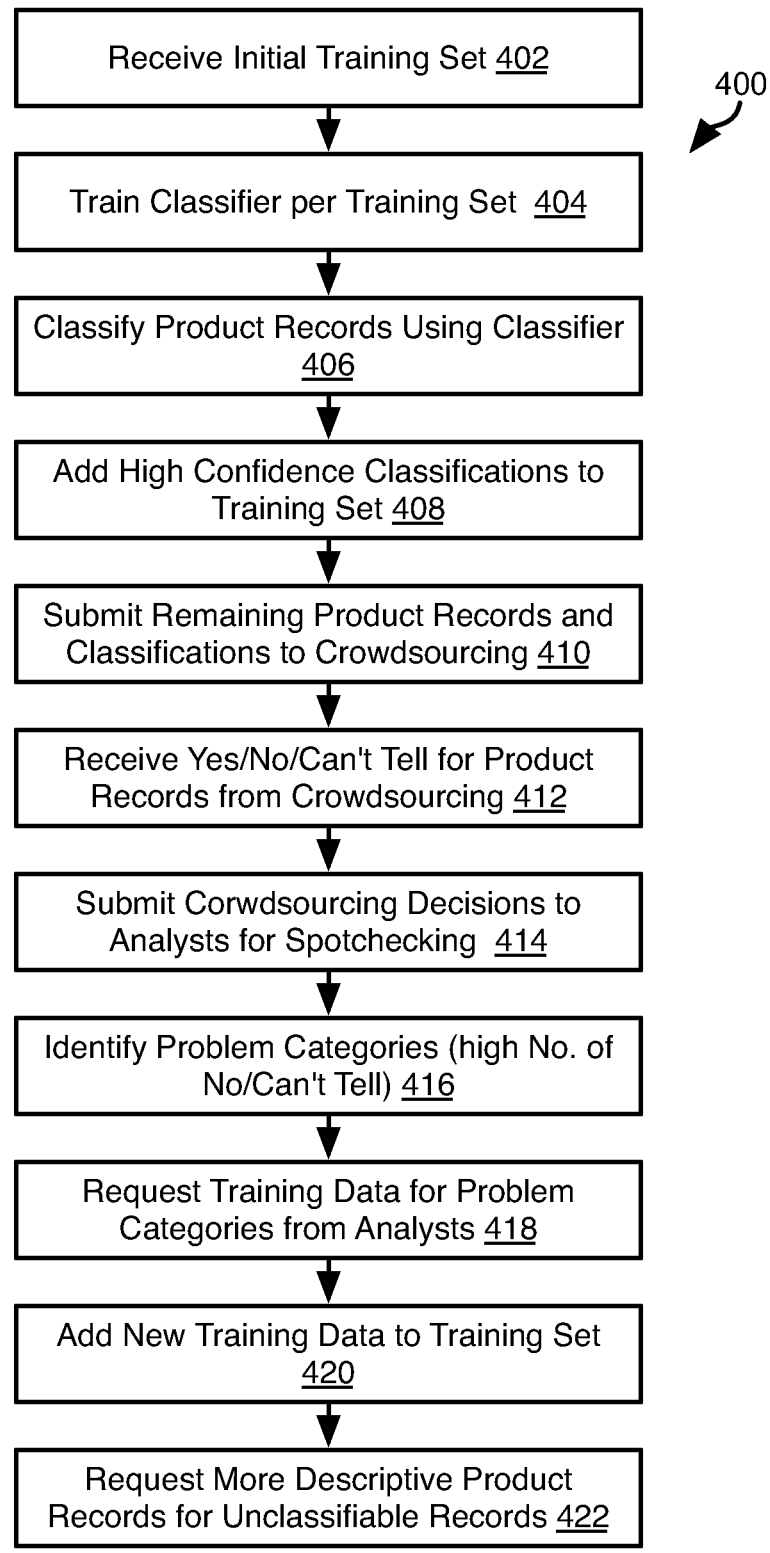
FIG. 4 is a process flow diagram of a method for training a classification model in accordance with an embodiment of the present invention.

FIG. 4 illustrates a method 400 that may be executed by a server system 102 with interaction with some or all of the analyst workstations 104, crowdsourcing workstations 106, and merchant workstations 108.

The method 400 may include receiving 402 an initial training set. The initial training set may be generated manually according to human judgment or retrieved from an existing set of training data. As noted above, the entries of the training set may include [text]->[classification value] pairings, where [text] is any text that might be found in a classified record and [classification value] is any node of a taxonomy, such as category, subcategory, or entity classification to which the text corresponds. A classifier model may then be trained 404 using the training set. Training 404 may include training using any machine learning algorithm known in the art. Some or all records in a record corpus may then be classified 406 using the classifier model as trained 404. Application of the classifier model to input records may also be performed according to any machine learning algorithm known in the art.

As mentioned above, the machine learning algorithm may associate a confidence score with a classification output as a result of the classification 406 of records. Those classifications with a confidence score above a specified threshold may be added 408 to the training set. A classification may include [text]->[classification value] pairs suitable for addition as an entry to the training set. In some embodiments, this step is omitted in order to prevent self-reinforcing errors.

Some or all of the classifications that are not identified as high confidence may then be submitted 410 to a crowdsourcing forum for validation. This may include distributing the some or all of the classifications to participants in a crowdsourcing forum, such as by transmitting classifications to crowdsourcing workstations 106 for display thereon. Classifications and requests to validate them may be transmitted to the crowdsourcing workstations 106 directly or by way of a module or entity coordinating distribution of tasks to a crowdsourcing forum.

For some or all of the classifications submitted 410 to the crowdsourcing forum, a validation decision may be received 412 from the crowdsourcing forum. A validation decision for a classification may be a simple yes or no indicating that the classification was correct or incorrect, respectively. A validation decision may also include a substitute value for the [classification value] field of a received classification. In some embodiments, a validation decision may also include an "unclear" option indicating that the record of a classification does not include sufficient information to determine whether or not the classification value corresponding thereto is correct.

In some embodiments, some or all of the validation decisions received 412 from the crowdsourcing forum may be submitted 414 to one or more analysts to verify that validation decisions are accurate. This may include transmitting some or all of the validations decisions to one or more analyst workstations 104. The validation decisions may then be displayed on the analyst workstation, possibly with a prompt to approve or disapprove of the validation decision and/or provide an alternative classification value.

Feedback may then be received by the analyst workstations 104 and transmitted to the crowdsourcing forum for presentation on a crowdsourcing workstation 106, either directly or by way of the server system 102. As noted above, an identifier associated with a classification or validation decision may be used to route feedback to an appropriate participant, e.g. the crowdsourcing workstation 106 of the appropriate participant. The feedback may then be displayed on the workstation 106 of the appropriate participant to provide education and training.

In some embodiments, classifications validated by the crowdsourcing forum may be added to the training set. In some embodiments, records found to be valid by the crowdsourcing forum may be excluded from subsequent classification in subsequent iterations of the method 400 unless implicated by changes to the training set as discussed below. In a like manner, high confidence classifications output from the classification model may likewise be excluded from being classified again unless implicated by changes to the training set.

The method 400 may further include automatically identifying 416 one or both of classification values and categories of classification values having a large number or proportion of classifications marked as invalid by the crowdsourcing forum. As noted above, a classification value may be identified as a problem area if a threshold-exceeding percentage of classifications from the classifier model including the classification value have been marked as invalid by the crowdsourcing forum. As also noted, a category may be identified 416 as a problem category if a threshold-exceeding percentage of classifications from the classifier model including classification values belonging to that category have been marked as invalid. Alternatively, a category may be identified 416 as a problem if a first threshold-exceeding percentage of classification values belonging to that category have a second threshold-exceeding percentage of classifications including classification values belonging to that category marked as invalid by the crowdsourcing forum. The first and second thresholds may be equal or unequal.

The method 400 may further include requesting 418 training data for the identified 416 classification values or categories. Requesting training data 418 may include automatically transmitting requests to one or more analyst workstations 104 to generate training data with respect to one or more identified 416 problem classification values or categories. The requests may then be displayed on the analyst workstations 104, such as a prompt or task to provide training data. An analyst workstation 104 may then receive input of training data, and transmit this training data to a server system 102. The request to provide training data may include some or all of the supplementary data noted above with respect to the system 300.

Training data received from an analyst, such as from an analyst workstation 104, may then be added 420 to the training set. In some embodiments, validation decisions from the crowdsourcing forum that include a substitute classification value or that validated a classification from the classifier model may also be added 420 to the training set. In some embodiments, the machine learning algorithm may use training data including negative classifications, e.g. [text]->[NOT classification value] (where [text] is found [classification value] should not be assigned]. In such embodiments, validations decisions that find a classification to be incorrect may also be added to the training data set in this format.

As noted above with respect to FIG. 3, where an analyst determines that a record includes too few terms or unneeded terms, the analyst may invoke transmission of a request 422 from the analyst workstation 104 to a merchant workstation 108 to modify the record by adding or removing terms.

Although the steps of the method 400 are listed in sequence one or more of the steps may be performed in parallel. Likewise, the method 400 may be performed in multiple iterations such that one iteration commences before all steps of the method 400 have been completed.

Figure 5:
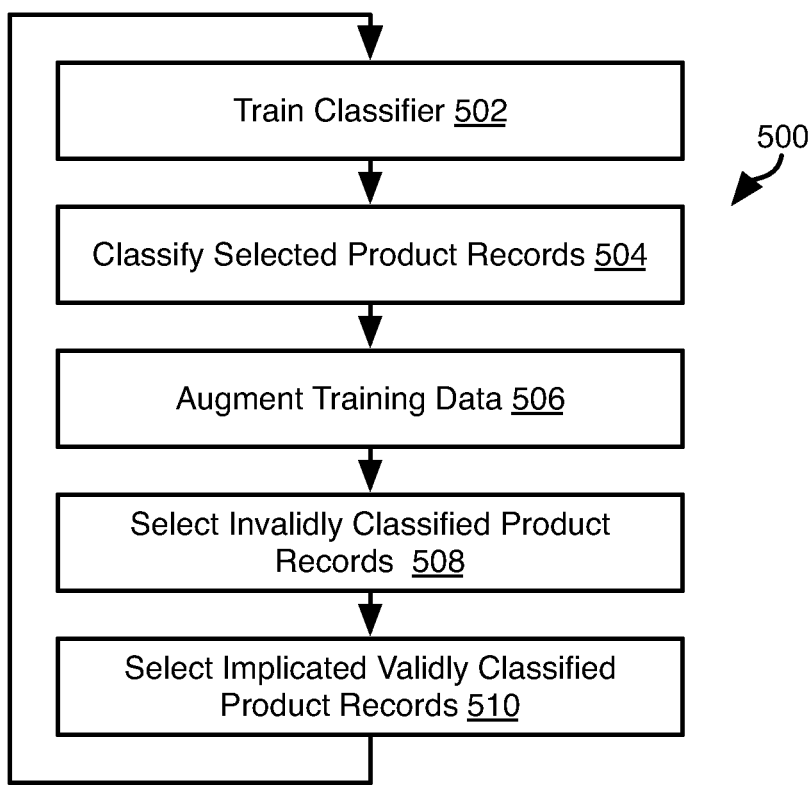
FIG. 5 is a process flow diagram of a method for iteratively training a classification model in accordance with an embodiment of the present invention.

Referring to FIG. 5, the method 400 of FIG. 4 may be repeated as additional training data is created as described above. For example, an iterative method 500 may be performed that includes training 502 a classifier model using training data, classifying 504 a selected portion of product records using the classifier model, and augmenting 506 training data as described above with respect to the system 300 and method 400. In particular, augmenting 506 training data may include training data received from an analyst workstation 104, crowdsourcing forum, or high confidence data output from a classifier model as described above.

The method 500 may additionally include preparing for a subsequent iteration of steps 502-506. For example, the method 500 may include selecting 508 some or all of the product records that were previously marked as invalid by the crowdsourcing community. In some embodiments, all product records marked as incorrectly classified may be classified again based on an augmented set of training data. In other embodiments, only those product records for which new training data implicating the product record has been received are selected 508. For example, in some embodiments, a product record may be classified according to a category and/or subcategory and these classifications may be confirmed. However, a subsequent classification to a subcategory or entity in a taxonomy may be marked as invalid. Accordingly, training data implicating such a record may be training data relating to a category or subcategory to which the product record has been accurately assigned and/or relating to a sub-category or entity belonging to a category or subcategory to which the product record has been accurately assigned.

The method 500 may further include selecting 510 a plurality of product records that were previously accurately classified 504 by the classifier model and that are implicated by the augmented 506 training data, e.g. training data having as the [classification value] corresponding to the [classification value] accurately associated therewith in a previous iteration. The manner in which a product record is determined to be implicated by added training data may be the same as for the step of selecting 508 implicated invalidated classifications. Selecting product records that were validly classified for reclassification may be performed to ensure that modifications to the classification model due to the augmented training data does not result in subsequent incorrect classification of these product records. In some embodiments, only a sampling, e.g. a random sample, of accurately classified product records implicated by the new training data are selected 510.

The method 500 may then be repeated by training 502 the classifier using the augmented 506 training data and classifying 504 selected product records selected according to one or both of steps 508 and 510.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for classification, the method comprising:
training, by a computer system, a classification model using a training data set;
after the training by the computer system of the classification model using the training data set, classifying, by the computer system, using the classification model, a first record set to generate a high confidence outcome set and a low confidence outcome set;
adding, by the computer system, the high confidence outcome set to the training data set;
using the low confidence outcome set as a classification outcome set, the classification outcome set including classifier-record pairings for records of the first record set, and submitting, by the computer system, the classification outcome set to a crowdsourcing computer network;
receiving, by the computer system, a validated portion and a non-validated portion of the classification outcome set from the crowdsourcing computer network;
adding, by the computer system, the validated portion to the training data set;
transmitting, by the computer system, the non-validated portion to an analyst computer network;
receiving, by the computer system, from the analyst computer network, additional training data relating to classifiers of the classifier-record pairings;
adding, by the computer system, the additional training data to the training data set;
retraining, by the computer system, the classification model using the training data set, including the high confidence outcome set, the validated portion, and the additional training data; and
after the retraining, classifying, by the computer system, using the classification model, a second record set.

2. The method of claim 1, further comprising:
identifying, by one of the computer system and the analyst computer network, a category of classifiers from the classifier-record pairings in the non-validated portion; and
generating, by one of the computer system and the analyst computer network, a prompt to generate training data for the category.

3. The method of claim 2, wherein the category is a node in a taxonomy.

4. The method of claim 3, wherein the taxonomy is a product taxonomy and the first record set is a product record set.

5. The method of claim 3 wherein a category of the taxonomy includes descendent sub-categories and individual classification values as descendants.

6. The method of claim 1, further comprising, generating an output, by one of the computer system and the analyst computer network, a prompt to generate replacement records for a portion of the first record set corresponding to at least a portion of the non-validated portion.

7. The method of claim 1, further comprising reclassifying, by the computer system, using the classification model, a portion of the first record set to generate an updated classification outcome set, the portion of the first record set corresponding to at least one category associated with the additional training data.

8. The method of claim 7, further comprising:
submitting, by the computer system, the updated classification outcome set to the crowdsourcing computer network;
receiving, by the computer system, an updated validated portion and an updated non-validated portion of the updated classification outcome set from the crowdsourcing computer network;
adding, by the computer system, the updated validated portion to the training data set; and
transmitting, by the computer system, the updated non-validated portion to the analyst computer network.

9. The method of claim 1 wherein the additional training data comprises a substitute classification received from the analyst computer network.

10. The method of claim 1 further comprising using the validated portion as high-accuracy data for responding to queries by users.

11. The method of claim 1 wherein the non-validated portion received from the crowdsourcing computer network comprises a first part of the low confidence outcome set for which the crowdsourcing computer network indicated that classifications generated by the classification model are unclear because text is insufficient to accurately judge whether the classifications are correct or what accurate classifications should be.

12. A system for classification, the system comprising one or more processors and one or more memory devices operably coupled to the one or more processors, the one or more memory devices storing executable and operational data effective to cause the one or more processors to:
train a classification model using a training data set;
classify, using the classification model, a first record set to generate a first classification outcome set, the first classification outcome set including classifier-record pairings for records of the first record set;
submit the first classification outcome set to a crowdsourcing computer network;
receive a validated portion and a non-validated portion of the first classification outcome set from the crowdsourcing computer network;
transmit the non-validated portion to an analyst computer network;
identify a category of classifiers from the classifier-record pairings in the non-validated portion wherein the category is a node in a taxonomy;
receive, from the analyst computer network, additional training data relating to classifiers of the classifier-record pairings;
add the additional training data to the training data set;
retrain the classification model using the training data set including the additional training data; and
reclassify, using the classification model, a second record set to generate a second classification outcome set.

13. The system of claim 12, wherein the executable and operational data are further effective to cause the one or more processors to classify the first record set to generate the first classification outcome set by:
classifying using the classification model, the first record set to generate a high confidence outcome set and a low confidence outcome set; and
using the low confidence outcome set as the first classification outcome set.

14. The system of claim 13, wherein the executable and operational data are further effective to cause the one or more processors to:
add the high confidence outcome set to the training data set.

15. The system of claim 12, wherein the executable and operational data are further effective to cause the one or more processors to:
generate a prompt to generate training data for the category.

16. The system of claim 12, wherein the taxonomy is a product taxonomy and the first record set is a product record set.

17. The system of claim 12, wherein the executable and operational data are further effective to cause the one or more processors to:
generate a prompt to generate replacement records for a portion of the first record set corresponding to at least a portion of the non-validated portion.

18. The system of claim 12, wherein the executable and operational data are further effective to cause the one or more processors to:
add the validated portion to the training data set.

19. The system of claim 12, wherein the executable and operational data are further effective to cause the one or more processors to reclassify a portion of the first record set to generate an updated classification outcome set, the portion of the first record set corresponding at least one category associated with the additional training data.

* * * * *